(12) United States Patent
Rajpathak et al.

(10) Patent No.: US 8,666,982 B2
(45) Date of Patent: Mar. 4, 2014

(54) METHOD AND SYSTEM TO AUGMENT VEHICLE DOMAIN ONTOLOGIES FOR VEHICLE DIAGNOSIS

(75) Inventors: Dnyanesh Rajpathak, Bangalore (IN); Vineet R Khare, Bangalore (IN); Rahul Chougule, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 214 days.

(21) Appl. No.: 13/267,173

(22) Filed: Oct. 6, 2011

(65) Prior Publication Data
US 2013/0091139 A1   Apr. 11, 2013

(51) Int. Cl.
*G06F 17/30* (2006.01)
(52) U.S. Cl.
USPC .................. 707/736; 707/748; 707/750
(58) Field of Classification Search
USPC .................. 707/736, 737, 748, 750
See application file for complete search history.

(56) References Cited

U.S. PATENT DOCUMENTS

| | | | |
|---|---|---|---|
| 4,658,370 A | 4/1987 | Erman | |
| 5,295,230 A | 3/1994 | Kung | |
| 5,805,776 A | 9/1998 | Juengst | |
| 6,374,261 B1 | 4/2002 | Alvarez | |
| 6,675,159 B1 * | 1/2004 | Lin et al. | 704/257 |
| 6,768,935 B1 * | 7/2004 | Morgan et al. | 701/29.6 |
| 7,092,937 B2 | 8/2006 | Morgan | |
| 7,216,052 B2 | 5/2007 | Fountain | |
| 7,647,238 B2 | 1/2010 | McIntosh | |
| 7,734,623 B2 | 6/2010 | Witbrock | |
| 7,822,747 B2 | 10/2010 | Clark | |
| 2007/0106499 A1 | 5/2007 | Dahlgren | |
| 2008/0133488 A1 | 6/2008 | Bandaru | |
| 2010/0030552 A1 * | 2/2010 | Chen et al. | 704/9 |
| 2011/0040796 A1 | 2/2011 | Shockro | |
| 2011/0270820 A1 * | 11/2011 | Agarwal | 707/709 |

FOREIGN PATENT DOCUMENTS

DE    19523483    1/1997

* cited by examiner

*Primary Examiner* — Vincent F Boccio
(74) *Attorney, Agent, or Firm* — Mark S. Cohen; Pearl Cohen Zedek Latzer Baratz LLP (57) ABSTRACT

A document may be received at a processing module. One or more tags may be applied to the document, each tag applied to a term, each tag representing a part of speech. One or more terms may be extracted from the document based on the tag. A weighting assignment parameter may be determined for each of the one or more extracted terms. Based on the weighting assignment parameter associated with each of the extracted terms, it may be determined whether the domain ontology includes the one or more extracted terms. If the domain ontology does not include the one or more extracted terms, the domain ontology may be augmented such that the domain ontology comprises the one or more extracted terms.

19 Claims, 5 Drawing Sheets

METHOD AND SYSTEM TO AUGMENT VEHICLE DOMAIN ONTOLOGIES FOR VEHICLE DIAGNOSIS

FIELD OF INVENTION

The present invention is related to augmenting vehicle domain ontologies using, for example, parts of speech tagging, frequency calculations, and semantic rendering.

BACKGROUND OF THE INVENTION

Many computing systems and processes include, interact with, or are associated with domain ontologies. Domain ontologies may, for example, be structural or systemic frameworks for organizing information in a computing device. Domain ontologies may, for example, include objects, classes, functions, restrictions, rules, axioms, relationships, and other components. Domain ontologies may, for example, include the vocabulary or dictionary of terms used in a reasoning system or method. A reasoning system or method may, for example, be a vehicle diagnostics reasoning, or other type of reasoning system or method. A vehicle domain ontology associated vehicle diagnostics system or method may, for example, include vehicle domain ontology terms or words (e.g., parts, systems, symptoms, corrections, failure modes, actions, labor codes, and other parameters) and relationships between the vehicle domain ontology terms.

A vehicle diagnostics reasoning system may, for example, use vehicle domain ontologies to interpret, reason, evaluate, or otherwise draw conclusions based on inputted data (e.g., technician reports or other documents). A vehicle diagnostics reasoning system or method may, for example, input data from vehicle technicians, warranty departments, service manuals, and other users. A vehicle diagnostics reasoning system may, however, not always be able to match, recognize or interpret data entered using the domain ontologies. The vehicle domain ontologies for vehicle diagnostics reasoning and other types of systems may, therefore, need to be frequently updated. Manually updating a vehicle domain ontology or other domain ontology may, for example, be time consuming and inefficient. A method or system to update vehicle domain ontologies in real-time may therefore be needed.

SUMMARY OF THE INVENTION

A document may be received at a processing module. One or more tags may be applied to the document, each tag applied to a term, each tag representing a part of speech. One or more terms may be extracted from the document based on the tag. A weighting assignment parameter may be determined for each of the one or more extracted terms. Based on the weighting assignment parameter associated with each of the extracted terms, it may be determined whether the domain ontology includes the one or more extracted terms. If the domain ontology does not include the one or more extracted terms, the domain ontology may be augmented such that the domain ontology comprises the one or more extracted terms.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Unless specifically stated otherwise, as apparent from the following discussions, throughout the specification discussions utilizing terms such as "processing", "computing", "storing", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may augment (e.g., add terms to) a domain ontology (e.g., a vehicle or automotive domain ontology) to include new vehicle domain specific terms using, for example, part of speech tagging, frequency weighting, comparison operations, and semantic rendering. According to some embodiments, one or more documents (e.g., vehicle technician reports, technician verbatim, vehicle service manuals, documents including vehicle related terminology, or other documents) may be received by the domain ontology augmentation system or another system or device. A document may be processed using for example tokenization, stop word removal, and/or other document processing operations. The processed document (e.g., without stop words) may, in some embodiments, be analyzed in a part of speech tagging operation. A part of speech tagging operation may, for example, apply, add, or otherwise associate tags or other metadata with or to one or more terms or words in the document. A tag may, for example, represent or indicate the part of speech (e.g., noun, verb, conjunction, preposition, or other part of speech) corresponding to a term or other information.

According to some embodiments, terms may be extracted (e.g., copied) from the document. For example, in the context of vehicle domain specific ontology, nouns, which may represent or correspond to parts (e.g., automobile parts); verbs, which may represent or correspond to actions; and/or other terms may be identified and copied or extracted from the document. The document (e.g. vehicle technician verbatim or other document) with nouns and verbs removed may be analyzed or evaluated to determine or identify symptoms or other vehicle domain ontology related terms.

According to some embodiments, the nouns (e.g., corresponding to parts or systems), verbs (e.g. corresponding to actions), symptoms, and/or other terms may be output to a weight assignment module. Weight assignment module may, for example, determine a frequency or weighting assignment parameter for each extracted term. The frequency or weighting assignment parameter may, for example, represent the frequency of occurrence of the term in the document (e.g., a technician verbatim, which may be a word-for-word transcript of a technician's report or verbal description) and/or the frequency of occurrence of documents including the extracted term. In some embodiments, the weighting assignment parameter need not be a literal count of frequency and may, for example, be a number (e.g., a number between 0 and 1), a percentage, and/or other derivation representing the frequency of occurrence of a term. For example, a derivation of the frequency of occurrence of a term may be a percentage (e.g., a percentage of occurrence), a number between 0 and 1, another number, and/or another parameter. The frequency parameter or weighting assignment parameter may, for example, be related to, indicative of, or representative of the criticality of an extracted term. For example, an extracted term with a low frequency parameter may be deemed to have low criticality.

According to some embodiments, a weight assignment module may, for example, output the extracted terms in a sorted list or ordered data set. The sorted list or ordered data set may, for example, include the extracted terms arranged according to frequency parameter. The sorted list or extracted parameters and associated frequency parameters may be evaluated during a verification operation. During a verification operation it may, for example, be verified whether the extracted terms are included in the domain ontology. The verification operation may, for example, be performed by a user, a text mining module, and/or a text comparison module. If the extracted term is verified to be in the existing domain ontology, the extracted term may be ignored. If, however, the extracted term is verified to not be in the existing domain ontologies, semantics or semantic rendering may be applied to the extracted term. Applying semantics or semantic rendering to a term may, for example, convert a term into a predefined semantics, syntax, or other format compatible with or consistent with the semantic structure of the domain ontologies. Semantic rendering may, for example, be applied to the term to transform or convert the extracted term into a syntax or semantic format compatible with the domain ontologies. The extracted term may, for example, be converted or transformed into resource description framework (RDF), Java, or other programming language compatible syntax. The semantically rendered extracted term may, in some embodiments, be added to the domain ontologies. The extracted term may, for example, be used in any operation employing the domain ontologies. For example, a vehicle diagnostics system including the domain ontologies may use the extracted term immediately or another time after the extracted term has been added to the domain ontologies.

Figure 1:
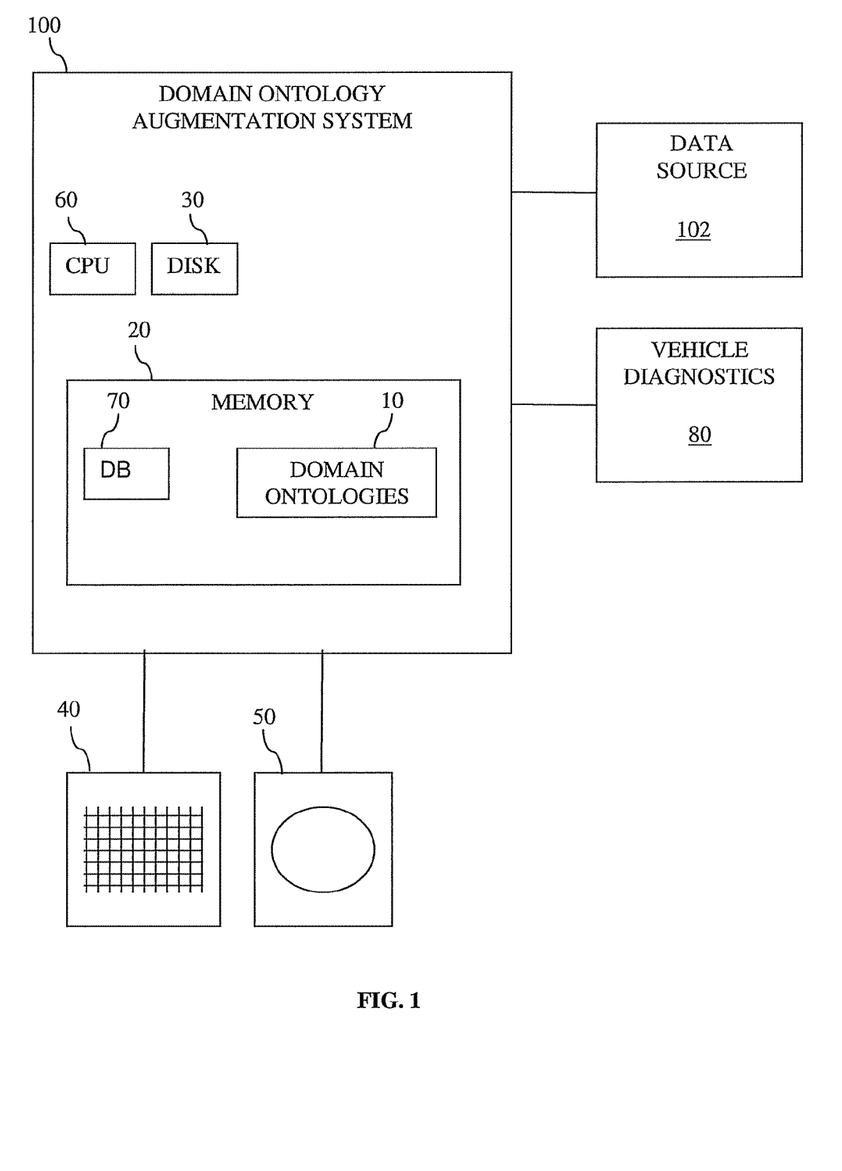
FIG. 1 is a schematic illustration of a domain ontology augmentation system according to embodiments of the present invention.

FIG. 1 is a schematic illustration of a domain ontology augmentation system according to embodiments of the present invention. Domain ontology augmentation system 100 may include one or more processor(s) or controller(s) 60, memory 20, long term storage 30, input device(s) or area(s) 40, and output device(s) or area(s) 50. Input device(s) or area(s) and output device(s) or area(s) 50 may be combined into, for example, a touch screen display and input which may be part of system 100.

System 100 may include one or more databases 70. Memory 20 or databases 70 may include, for example, domain ontologies 10 and other information. Domain ontologies 10 may, for example, include part, symptom, corrections, subsystems, words, terms, text, and other types of parameters or information. Databases 70 may be stored all or partly in one or both of memory 20, long term storage 30, or another device.

Processor or controller 60 may be, for example, a central processing unit (CPU), a chip or any suitable computing or computational device. Processor or controller 60 may include multiple processors, and may include general-purpose processors and/or dedicated processors such as graphics processing chips. Processor 60 may execute code or instructions, for example, stored in memory 20 or long-term storage 30, to carry out embodiments of the present invention.

Memory 20 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 20 may be or may include multiple memory units.

Long term storage 30 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Domain ontology augmentation system 100 may, in some embodiments, be a component of, operate in conjunction with, or be associated with vehicle diagnostics module 80 (e.g., vehicle diagnosis reasoner, vehicle warranty claims module, or another device or module). A data source 102 may, in some embodiments, be connected to (e.g., via the Internet, remote servers, or hard-wire connection) or associated with system 100. Data source 102 may, for example, transfer information (e.g., documents, vehicle technician reports, technician verbatim) to system 100.

Figure 2:
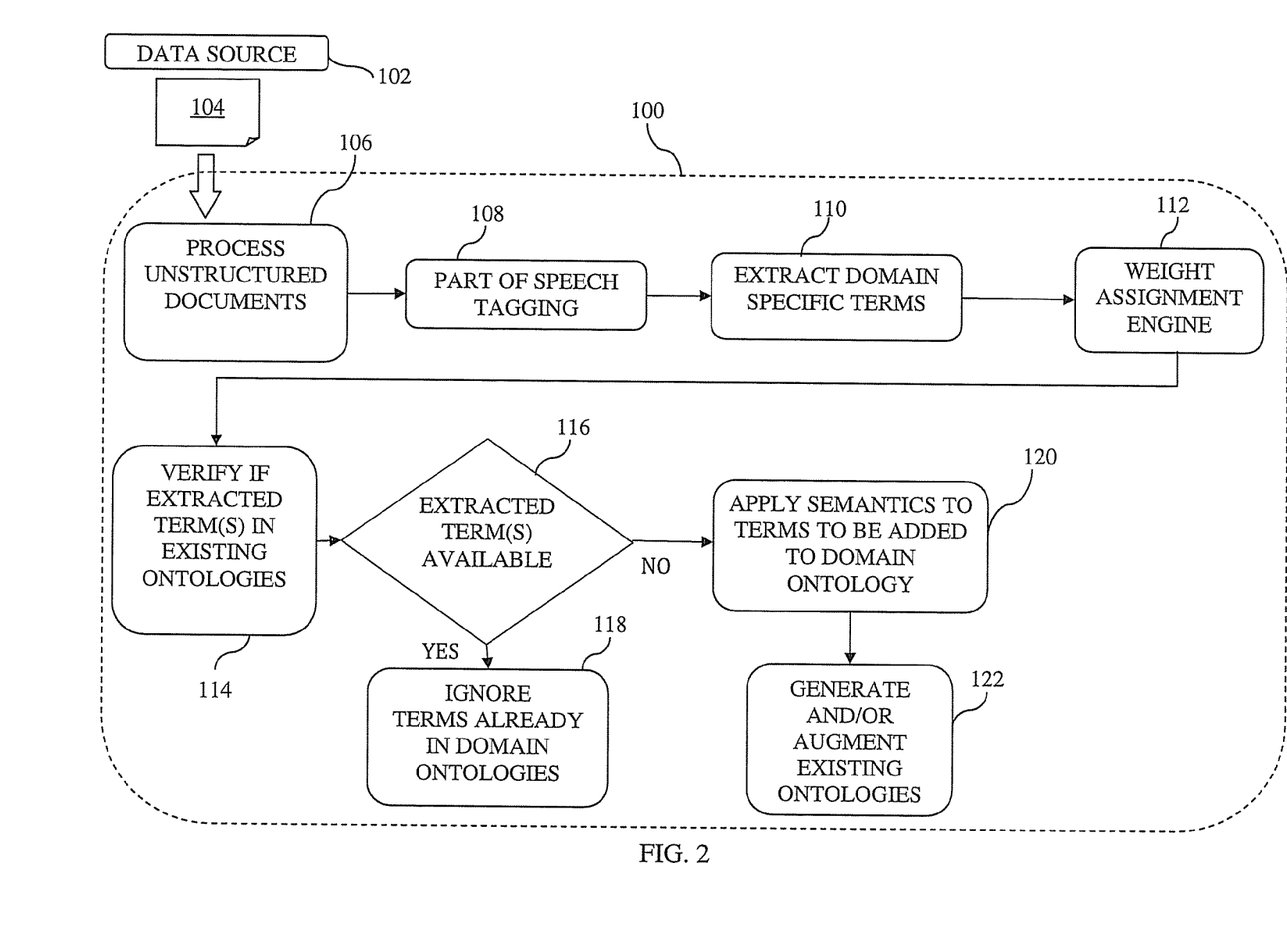
FIG. 2 is a block diagram depicting the operation of a domain ontology augmentation system according to embodiments of the present invention.

FIG. 2 is a block diagram depicting the operation of a domain ontology augmentation system according to embodiments of the present invention. Documents, data, or information 104 (e.g. a technician verbatim) may be received by domain ontology augmentation system 100 or another device from a data source 102 (e.g., a personal computer, mobile device, remote server, or other device).

Documents 104 may be received by system 100 (e.g., at a processing module 106) and may be processed, modified, or transformed into a format for searching and tagging by system 100. Documents 104 received at system 100 may, for example, be unstructured stream of text, characters, and/or strings. In a tokenizing operation, the unstructured stream may, in some embodiments, be separated, broken, or divided into terms, words, phrases, phonemes, symbols or other elements, which may be identified in tagging, text identification, parsing, sorting, or other operations. Processing module 106 may, in some embodiments, remove stop words or terms. A processing method or system 106 may output the document 104 from the tokenizing operation, stop word removal operation, and/or other operation(s) to part-of-speech tagging module 108.

According to some embodiments, part-of-speech tagging, grammatical tagging, or word-category disambiguation module 108 may, for example, tag, categorize identify, or mark different types of terms, words, phrases, or parts of speech. Part of speech tagging 108 may, for example, categorize all terms or words in document 104 as nouns, verbs, conjunctions, prepositions, and/or other parts of speech, categories of words, or other categories. Tags (e.g., metadata or other type of tag) may, for example, be applied to or associated with the terms or words in document 104 based on the part of speech (e.g., noun, verb, conjunctions, prepositions, etc.) corresponding to the term (e.g., based on the tag or metadata). Applying a tag may, for example, mean associating, categorizing, and/or linking a term and a tag (e.g., a non-hierarchical keyword and/or metadata). Tags may, for example, be applied to the terms or words by generating a map (e.g., a separate document, list, and/or database) including terms in document 104 and tags associated with the terms. The map may, for example, be linked to document 104. Tags may, in some embodiments, be applied to the terms or words by adding metadata to document 104 (e.g., inserted into document 104 or code near the terms), and/or using other systems or methods. Document 104 with tagged terms or words and/or map including terms or words and associated tags may, for example, be output to an extraction module 110. One or more tags may, for example, be applied to the terms in document 104, each tag may apply or be relevant to one or more terms (e.g., a single word or term, multiple words or terms, and/or phrases), and each tag may represent a part of speech.

According to some embodiments, an extraction module 110 may determine and copy or extract one or more terms (e.g., vehicle domain specific terms) from document 104. Extracting terms may, for example, include identifying, determining, copying, moving, and/or transferring the term from a document; establishing a pointer to a term; and/or associating a term with or adding a term to another document (e.g., a document of extracted terms). Vehicle domain ontology specific terms may, for example, include actions (e.g., replace, perform, etc.), symptoms (e.g., DTCSymptoms, nonDTC symptoms, or other types of symptoms), parts, failure modes, systems, subsystems, labor codes, causes, and other vehicle diagnostics related terms. For example, each term or word corresponding to or associated with a part, action, and/or symptom may be extracted from document 104. Extracted parts, actions, symptoms, and other domain specific terms may, for example, be output to weight assignment engine or weight assignment module 112

According to some embodiments, weight assignment engine or module 112 may determine a frequency or weight of terms in a document and a frequency of documents including the term in vehicle domain ontologies. A weighting assignment parameter or frequency parameter value for the one or more extracted terms (e.g., actions (e.g., represented by verbs), parts (e.g., represented by nouns), symptoms, and other vehicle diagnostics domain specific terms) may, for example, be determined by weight assignment module 112. Each extracted domain specific term (e.g., action, part, symptoms, etc.) may, for example, be assigned a weighting assignment parameter value. The weighting assignment parameter value may, for example, be used to determine the criticality of each term in the document. The criticality of a domain specific term may, for example, be based on, proportional to, or related to the frequency of occurrence of the term or frequency at which the term appears in technician verbatim, technician reports, or documents 104. For example, a term that appears more frequently in documents (e.g., vehicle technician verbatim) may be deemed to be a more critical term.

According to some embodiments, the terms and weighting assignment parameter values or criticality may be organized in a list, data set, or other organizational form. The list of domain specific terms may, for example, be organized or sorted in order of frequency or criticality. A weighting assignment parameter may, for example, represent the number of occurrences of a term in the database of documents (e.g., corpus of documents) or other database. For example, weighting assignment parameter may be or may represent the percentage of occurrences of one or more terms in a database of documents (e.g., corpus of documents) or other database. In some embodiments, terms (e.g., parts, action, symptoms, etc.) associated with a weighting assignment parameter below a threshold weighting assignment parameter (e.g., a weighting assignment parameter threshold of 0.05 or another value) may be removed from the sorted list. The sorted list of terms may, for example, be output to a verification module 114.

According to some embodiments, the sorted list of terms may be analyzed to verify that the extracted terms are relevant to the subject matter of the ontologies. Verification (114) may, in some embodiments, be performed automatically (e.g., by processor 60 or another device). Terms may, for example, be verified using or based on a weighting assignment parameter value associated with each term. Terms associated with a weighting assignment parameter value above a predefined weighting assignment parameter threshold may, for example, be deemed valid terms or verified terms.

Verification (114) may, in some embodiments, be performed by a user (e.g., a vehicle engineer, vehicle technician, or other user), by a text comparison module, text mining module, and/or other system or method.

According to some embodiments, the sorted list of terms may be analyzed, evaluated or inspected to verify whether the extracted terms are included, available, or represented in a domain ontology, existing domain ontologies (e.g., vehicle domain specific ontologies), and/or the corpus of documents. In some embodiments, extracted terms that are included in existing ontologies may, for example, be set aside, ignored, or used in other operations, methods, or systems (118).

According to some embodiments, if domain ontology 10 does not comprise the one or more extracted or verified terms (e.g., a term associated with a frequency parameter value above a predefined threshold), the domain ontology may be augmented (e.g., have terms added to it) to include the one or more extracted terms extracted terms. Semantics (120) may, for example, be applied to extracted terms that are verified to be associated with a weighting assignment parameter above a predefined threshold and/or verified to not be included in existing ontologies. Extracted terms not included in existing ontologies may, for example, be rendered, converted, transformed, or mapped into resource description framework (RDF), Java, or another programming language syntax format. The verified extracted terms represented in RDF, Java, or other syntax format may, for example, augment the existing ontologies (122). For example, semantically rendered extracted terms may be added to the domain ontologies and used in real-time without programming or processing by a user.

The operations of modules in system 100 and or other modules, operations, systems, or methods discussed herein may, for example, be performed by processor 60 within system 100 executing instructions stored in memory 20 within system 100, but may be performed by another processor, by dedicated hardware, or other systems.

Figure 3:
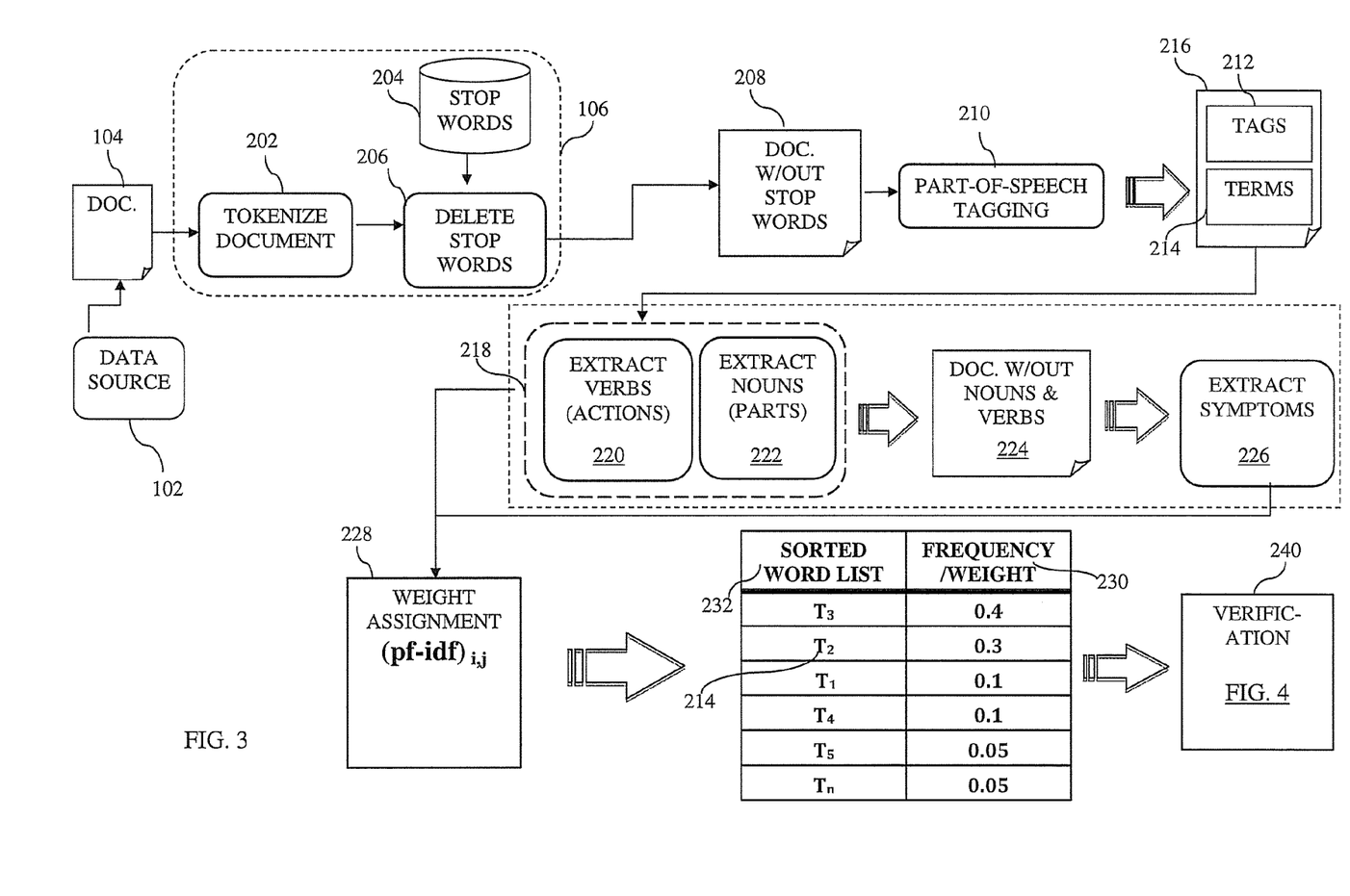
FIG. 3 is a block diagram illustrating the operation of a portion of a domain ontology augmentation system according to embodiments of the present invention.

FIG. 3 is a block diagram illustrating the operation of a portion of a domain ontology augmentation system according to embodiments of the present invention. Documents, data or information 104 may be received by domain ontology augmentation system 100 or another device from a data source 102. Data source 102 may, for example, be a personal computer, mobile device, input device, remote server, or other device. A user (e.g., a vehicle technician or other user) may, in some embodiments, enter information and/or data (e.g., vehicle diagnostics information, warranty claim information, or other data or information) into a personal computer, mobile device, or other computing device. The computing device may, for example, transfer document 104 including the information and/or data to system 100 or other device. Documents 104 may, for example, be technician verbatim, technician reports, vehicle technician verbatim, vehicle service manual, list of vehicle related terms, vehicle maintenance terms, or other documents. Documents 104 may, for example, include words (e.g., strings of text, characters, or other information), sentences, or other information. Documents 104 may be transferred to system 100 directly (e.g., via hard-wire connection), via a remote server, the Internet, or other device or method.

According to some embodiments, strings of text in a document 104 may be tokenized, separated, segmented or divided in a tokenization operation 202. Documents 104 received at system 100 may, for example, be an unstructured stream of text, characters, and/or strings. During tokenization 202, the unstructured stream may, for example, be separated, broken, or divided into terms words, phrases, phonemes, symbols or other units of text. The unstructured stream of text, characters, strings, and/or other types of data may, for example, include or be separated by blank space(s). The blank space(s) may, for example, be removed in a tokenization operation 202. Other formats or data structures may be used.

According to some embodiments, stop words 204 may be removed from document 104 during a stop word deletion or removal operation 206. Stop words 204 may, for example, include articles (e.g., the, a, an, or other articles), connectors (e.g., but, and, although, therefore, nevertheless, or other connectors), prepositions (e.g., to, on, against, or other prepositions), and/or other parts of speech or grammar. For instance, standard stop word lists are publicly available and may be well known. A processing method or system 106 may output to a part of speech module 108 a document without stop words 208. Document without stop words 208 may, in some embodiments, be tokenized (202) and include minimal or no stop words 204. For example, document 208 may include separated terms, words, sentences, phrases, and/or other grammatical parts. Terms and words may, for example, be a single word or term or a combination of words or terms.

For example, tokenization operation 202 may input a document with an uninterrupted stream of text, symbols or characters output a document 104 with separate words, for example, "THE C-S TRACTION OFF LIGHT ON AT TIMES WHILE DRIVING NECESSARY TO REPLACE ELECTRONIC_BODY_CONTROL_MODULE AND PROGRAMMED." Stop word removal operation 206 may, for example, remove articles (e.g., THE or other articles), connectors (e.g., AND, WHILE, and other connectors), prepositions (e.g., TO and other prepositions), and/or other parts of speech. For example, document without stop words 208 may, for example, include "C-S TRACTION OFF LIGHT ON AT TIMES DRIVING NECESSARY REPLACE ELECTRONIC_BODY_CONTROL_MODULE PROGRAMMED."

According to some embodiments, part-of-speech tagging, grammatical tagging, or word-category disambiguation module 210 may, for example, tag, identify, mark, or delineate different types of words, phrases, or parts of speech. Part of speech tagging 210 may, for example, categorize all terms or words 214 in document 208 as nouns, verbs, conjunctions, prepositions, and/or other parts of speech, categories of words, or other categories. A tag 212 may be attached to each term or word 214 in document 208. Tags 212 may, for example, be metadata, a key-word, or term attached to each of one or more words or terms 214 in a tagged document 216. Tags 212 may, for example, identify the part of speech (e.g., noun, verb, conjunction, preposition, or other parts of speech) of each word or term 214 in tagged document 216. Tags 212 may, for example, be "noun", "verb", "conjunction", "preposition", and/or other parts of speech. For example, document 208 may include the words "C-S TRACTION OFF LIGHT ON AT TIMES DRIVING NECESSARY REPLACE ELECTRONIC_BODY_CONTROL_MODULE PROGRAMMED." Nouns may include, in this example, TRACTION OFF LIGHT, ELECTRONIC_BODY_CONTROL_MODULE, and/or other words. Nouns, terms and words may, for example, be a combination of words or a phrase (e.g. ELECTRONIC_BODY_CONTROL_MODULE or other combinations of words or phrases). Verbs may include, in this example, ON AT, DRIVING, REPLACE, PROGRAMMED, and other words. Verbs, terms and words may, for example, be a combination of words or a phrase (e.g. ON AT, or other combinations of words or phrases). Tags 212 may, for example, be applied to the nouns, verbs, and other parts of speech in document 216. A document or file including the words 214 and associated tags 216 (e.g., a part of speech tagged document 216) may, for example, be output to an extraction module 218.

According to some embodiments, an extraction module 218 may, for example, determine and extract vehicle domain specific terms (e.g., domain ontology specific terms). Vehicle domain ontology specific terms may, for example, include actions 220, symptoms 226 (e.g., DTCSymptoms, nonDTC symptoms, or other types of symptoms), parts 222, failure modes, systems, subsystems, labor codes, causes, and other vehicle diagnostics related terms. Actions 220 may, for example, typically be or be represented by verbs (e.g., replace, repair, clean, and other actions) in document 216 (e.g., a vehicle technician report or other document). Parts 222 may, for example, typically be or be represented by nouns (e.g. battery, door, engine, electronic body control module, traction off light, and other parts) in document 216.

According to some embodiments, one or more actions 220 (e.g., verbs) may be extracted from document 216. Actions 220 may, for example, be extracted by determining which terms 214 in document 216 include a tag 212 of, for example, "verb" or another tag 212. Words or terms 214 with tag 212 "verb" may, for example, be extracted and/or output to weight assignment engine or weight assignment module 228.

According to some embodiments, one or more parts 222 (e.g., nouns) may be extracted from document 216. Parts 222 may, for example, be extracted by determining which terms 214 in document 216 include or are associated with a tag 212 of, for example, "noun" or another tag 212. Terms 214 with tag 212 "noun" may, for example, be extracted and/or output to weight assignment engine 228. Parts 222 may, in some embodiments, be removed from document 216.

A document with nouns and verbs extracted or removed (e.g., document without nouns and verbs 224) may, in some embodiments, be output to symptom extraction module 226. Symptoms 226 may, for example, be vehicle conditions which indicate a malfunction, maintenance issue, or other irregularity. Symptoms 226 may, for example, be "low", "engine warning light on", and/or other indications of vehicle malfunctions, maintenance issue, or other irregularity.

For example, document 104 may include the phrase "the battery is low it is charged." Stop words 204 (e.g., "the", "is", "it") may, for example, be extracted during a stop word removal operation 206. During part of speech tagging 210 or during another process, actions 220 (e.g. "charged") may, for example, be tagged or associated with a "verb" tag 212. Parts 222 (e.g., "battery") may, for example, be tagged or associated with a "noun" tag 212. Actions 220 and parts 222 (e.g., terms 214 associated with verb and noun tags 212) may, for example, be removed from document 104. Document without nouns and verbs 224 may, for example, be output to symptom extraction module 226.

In some embodiments, symptom extraction module 226 may determine which terms in document without nouns and verbs 226 are symptoms. In order to determine symptoms, document without nouns and verbs 224 and document 104 may, for example, be compared to determine terms 214 in document without nouns and verbs 224, which appear adjacent to terms 214 associated with a noun tag 212 (e.g., part(s)) in document 104. Terms 214 in document without nouns and verbs 224, which appear adjacent to terms 214 associated with a noun tag 212 (e.g., part(s)) in document 104 may, for example, be deemed symptoms. Some terms 214 associated with a noun tag 212 and adjacent terms 214 deemed symptoms may, in some embodiments, be deemed or identified as part-symptom phrases.

Terms 214 deemed symptoms may, for example, be extracted from document 224 (e.g., document with one or more nouns and one or more verbs extracted). Extracted symptoms and other domain specific terms may, for example, be output to weight assignment engine or weight assignment module 228.

According to some embodiments, weight assignment engine or module 228 may determine a weight assignment parameter, frequency of occurrence, or weight 230 of each of the extracted domain specific terms, or assign or associate a weight with each term. The frequency of domain specific term may, for example, represent the frequency of occurrence of a term (e.g., actions (e.g., represented by verbs), parts (e.g., represented by nouns), symptoms, and other vehicle diagnostics domain specific terms) in the domain ontology 10. The frequency of occurrence of the domain specific terms may, in some embodiments, be represented by a frequency parameter value 230, which may be calculated by weight assignment module 228. Each extracted domain specific term (e.g., action, part, symptoms, etc.) may be assigned or associated with a frequency parameter value 230. The frequency parameter value 230, $(pf-idf)_{i,j}$, may, for example, be calculated using an equation such as the following equation:

$$(pf - idf)_{i,j} = pf_{i,j} * idf_i = \frac{n_{i,j}}{\sum_k n_{k,j}} * \log\left[\frac{|DOC|}{|\{doc: p_i \in doc\}|}\right]$$

The frequency parameter value 230, $(pf-idf)_{i,j}$, may, for example, be equal to the frequency of a word 214 in a document 216, $pf_{i,j}$, multiplied by the logarithmic frequency, $idf_i$, of the total amount of documents 216 which include the word 214 with respect to total documents 216 in the domain ontology.

According to some embodiments, the frequency of a term 214 in a document 104, $pf_{i,j}$, may, for example, be equivalent to the number of occurrences of term 214, $p_i$, in a document 216, $n_{i,j}$, divided by the total number of terms 214 in a document 216, $$\sum_k n_{k,j}.$$

For example, the frequency of the part "battery" in a technician verbatim (e.g., document 216), $pf_{i,j}$, may be equivalent to the total number of occurrences of the term "battery", $n_{i,j}$, divided by the total number of terms 214 (e.g., parts, actions, symptoms, etc.) in the technical verbatim, $$\sum_k n_{k,j}.$$

According to some embodiments, logarithmic frequency of documents 104 which include a term 214, $idf_i$, may be equivalent to the logarithm of the total number of documents 216 input to system 100, |DOC|, divided by the total number of documents input to system 100 which include term 214, |{doc: $p_i \in$ doc}|. For example, logarithmic frequency of the term 214 battery may be equivalent to the logarithm (e.g., log(x)) of the total technician verbatim (e.g., documents 216) in system 100, |DOC|, divided by the number of technician verbatim in system 100, which include the term 214 battery, |{doc: $p_i \in$ doc}|.

According to some embodiments, terms 214 and frequency of occurrence or frequency parameter values 230, $(pf-idf)_{i,j}$, or criticality may be organized in a sorted term or word list, data set, or other organizational form 232. Sorted list of terms or words 232 (e.g., domain specific terms) may, for example, may be organized or sorted in order of frequency of occurrence 230 or criticality. Sorted list 232 may, for example, be output to verification module 240.

Figure 4:
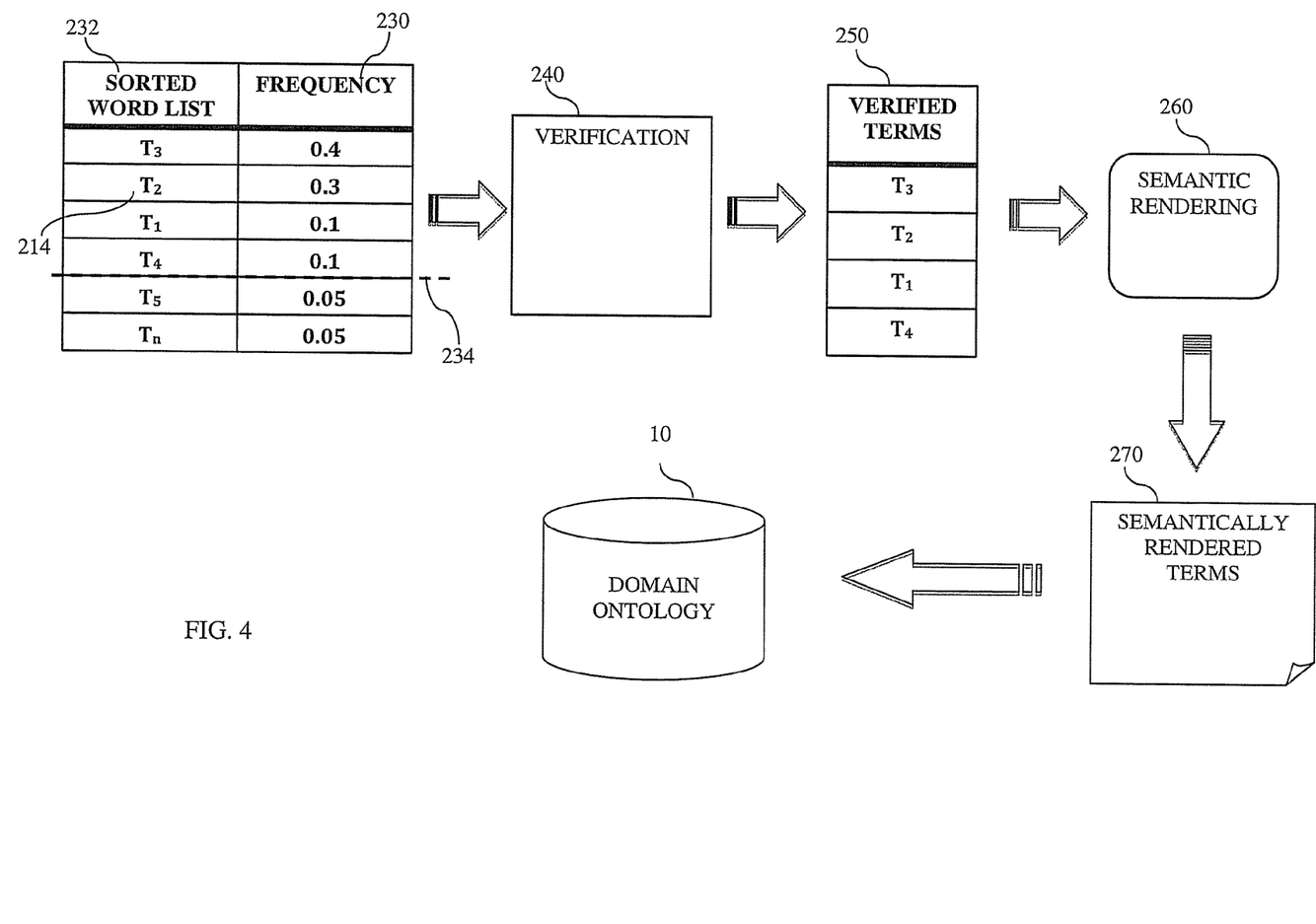
FIG. 4 is a schematic illustration of a portion of domain ontology augmentation system according to embodiments of the present invention.

FIG. 4 is a schematic illustration of a portion of domain ontology augmentation system according to embodiments of the present invention. According to some embodiments, the sorted list of terms 232, list of terms, and/or terms may be analyzed, evaluated or inspected in a verification operation 240 to verify whether words or terms 214 are valid (e.g., based on the criticality of words or terms) and/or not included in existing domain ontologies. Sorted list of terms 232 may, in some embodiments, be evaluated or inspected in a verification operation 240 to determine whether words or terms 214 are included, available, and/or represented in the existing ontologies (e.g., vehicle domain specific ontologies, service manual, vehicle maintenance database, vehicle warranty claims database, or other database). It may, for example be determined, based on the weighting assignment parameter associated with each of the extracted terms, whether a domain ontology comprises the one or more extracted terms Frequency of occurrence or weighting assignment parameter 230 associated with each word 214, $(pf-idf)_{i,j}$ may, for example, be used to determine the criticality of each term 214 in the document 216. The criticality of a term 214 (e.g., a part, action, system, etc.) may, for example, be based on, proportional to, and/or related to the frequency of occurrence 230 associated with word 214. For example, a term 214 in document 216 associated with a relatively high frequency or weighting assignment parameter value 230 in comparison with other terms 214 in document 216 may be deemed to be more critical or have a higher criticality than that the other terms 214 in document 216. For example, a word 214 that appears more frequently in documents 216 (e.g., vehicle technician verbatim) may be deemed to be a more critical term 214.

In some embodiments, the criticality of a term 214 may, for example, be used to determine whether term 214 is a valid or verified term or word 250. Terms 214 (e.g., parts, actions, symptoms, etc.) associated with a weighting assignment parameter value 230 above threshold weighting assignment parameter value 234 may, for example, be deemed valid, validated, high frequency and/or high criticality terms 250. Terms 214 (e.g., parts, action, symptoms, etc.) associated with a weighting assignment parameter value 230 below a threshold weighting assignment parameter value 234 (e.g., a weighting assignment parameter value threshold of 0.05 or another value) may be removed from sorted list 232. A list of valid, verified, high frequency, or high criticality (e.g., above a threshold frequency 234) terms 250 may, in some embodiments, be output to a semantic rendering module 260. Sorted list of valid terms 250 may, in some embodiments, be analyzed and/or verified by a user and output to a semantic rendering module 260.

Verification operation 240 may, in some embodiments, be performed by a user (e.g., a vehicle engineer, vehicle technician, or other user), by a text mining module, text comparison module, or other system or method. A user may, for example, be prompted to verify that extracted terms 214 (e.g., terms 214 in sorted list 232 or other list or database) are not represented or included in domain ontologies 10 (e.g., existing domain ontologies). In some embodiments, a text mining operation may be supervised by user. User may, for example, verify the output of the text mining operation.

Terms 214 in sorted list 232 may, for example, be verified by comparing extracted terms 214 in sorted list 232 to existing words in the existing domain ontologies 10 or measuring the similarity between extracted terms 214 and existing terms in the ontologies 10. In some embodiments, terms 214 in sorted list 232 associated with a weighting assignment parameter value 230 above threshold weighting assignment parameter 234, may be compared to existing words in the existing domain ontologies 10. Terms 214 in sorted list 232 may, for example, be compared to terms or words in existing domain ontologies 10 using a text mining operation, text comparison operation, text mining tool, or other operation or method. Based on the comparison of or measured similarity between extracted terms 214 and existing words in domain ontologies 10, it may be determined or verified whether one or more extracted terms 214 match existing terms in the domain ontology. The term match, when used herein, may mean that the term 214 matches, closely matches, approximately matches, or closely resembles terms in domain ontologies 10.

According to some embodiments, the sorted list of terms 232 may, for example, be analyzed to verify that the extracted terms 214 are relevant to the subject matter of the domain ontologies 10. For example, in the context of a vehicle specific domain ontology 10, it may be determined whether sorted list of terms 232 are relevant to vehicles or vehicle maintenance.

According to some embodiments, extracted terms that are included in existing domain ontologies 10 may, for example, be set aside, ignored, or used in other operations, methods or systems. Extracted terms included in existing domain ontologies 10 may be ignored because the goal of verification may, for example, be to identify words 214 not in existing domain ontologies 10, so existing domain ontologies 10 can be augmented to include new words 214. The existing extracted words 214 may, for example, be used in vehicle diagnostics 80 (e.g., vehicle diagnosis, vehicle warranty claim, or other types of analysis) or other operations.

According to some embodiments, extracted words 214 which are not included in existing domain ontologies 10 may, for example, be input to a semantic rendering module 260. In a semantic rendering operation 260, semantics may, for example, be applied to extracted terms 214 that are not included in existing ontologies 10. By applying semantics, words 214 may, for example, be rendered, converted, transformed, or mapped into resource description framework (RDF), Java, or other syntax format. During a semantic rendering operation 260, relations between semantically rendered words or terms 270 and other words or terms 214 may be defined. If, for example, semantically rendered word 270 is an action (e.g., replace, perform, etc.), the action may be linked to related systems, parts, symptoms and other words 214 in domain ontologies 10. Semantically rendered words or terms 270 may be output to or added to one or more domain ontologies 10 or another device or operation.

According to some embodiments, semantically rendered extracted words or terms 270 may, for example, be input to or added to domain ontologies 10 (e.g., existing domain ontologies). Domain ontologies 10 may, therefore, be augmented to include semantically rendered words or terms 270 that were not available or present in existing ontologies 10. Domain ontologies 10 including newly added semantically rendered words 270 may be used by an application or module (e.g., vehicle diagnostics, vehicle warranty claims, or other application) at the time of upload or addition to domain ontology 10.

Figure 5:
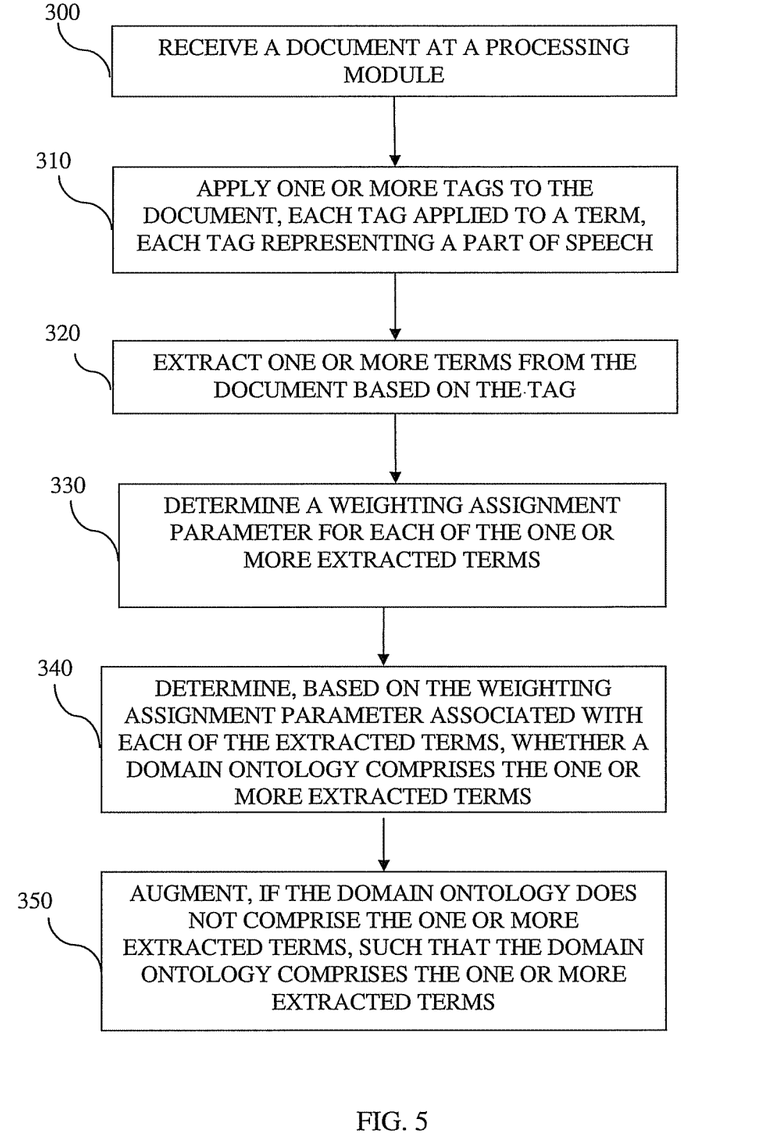
FIG. 5 is a flowchart of a method according to embodiments of the present invention.

FIG. 5 is a flowchart of a method according to embodiments of the present invention. In operation 300, a document (e.g., document 104 of FIG. 2) may be received at a processing module (e.g., processing module 106 of FIG. 2).

In operation 310, a tag (e.g., tag 212 of FIG. 3) may be added or applied to or associated with one or more terms (e.g., term 214 of FIG. 3) in the document based on one or more parts of speech. The one or more parts of speech may, for example, include nouns (e.g., nouns 222 in FIG. 3), verbs (e.g., verbs 220 in FIG. 3), conjunctions and prepositions.

In operation 320, one or more terms may be extracted, copied, or identified from the document from the based on the tag, or based on a comparison of the tag or metadata to a set of speech parts. One or more nouns and one or more verbs may, for example, be extracted from the document. One or more symptoms (e.g., symptoms 226 of FIG. 3) may be extracted from the document with one or more nouns and one or more verbs extracted (e.g., document without nouns and verbs 224 or FIG. 3). The one or more nouns, verbs, and symptoms may be output to a weight assignment module (e.g., weight assignment module 228 of FIG. 3).

In operation 330, a weighting assignment parameter (e.g., frequency or weighting assignment parameter 230 of FIG. 3) for each of the one or more extracted terms may be determined.

In operation 340, it may be determined, based on the weighting assignment parameter associated with each of the extracted terms, whether a domain ontology (e.g., domain ontology 10 in FIG. 1) includes the one or more extracted terms.

In operation 350, if the domain ontology does not include the one or more extracted terms, the domain ontology may be augmented such that the domain ontology comprises the one or more extracted terms.

Other or different series of operations may be used.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method comprising:
   receiving a document;
   applying one or more tags to the document, each tag applied to a term, each tag representing a part of speech;
   extracting one or more terms from the document based on the tags;
   determining a frequency parameter for each of the one or more extracted terms, wherein the frequency parameter is proportional to a logarithm of a total number of documents in the domain ontology divided by a number of documents in which the term appears;
   determining, based on the frequency parameter associated with each of the extracted terms, whether a domain ontology comprises the one or more extracted terms; and
   augmenting, if the domain ontology does not comprise the one or more extracted terms, such that the domain ontology comprises the one or more extracted terms.

2. The method of claim 1, wherein augmenting, if the domain ontology does not comprise the one or more extracted terms, such that the domain ontology comprises the one or more extracted terms comprises:
   rendering semantically the one or more extracted terms not in the domain ontology; and
   adding the semantically rendered one or more extracted terms to the domain ontology.

3. The method of claim 1, wherein applying the tags comprises applying a tag to the one or more words corresponding to the part of speech of the word.

4. The method of claim 1, wherein the one or more parts of speech comprise nouns, verbs, conjunctions and prepositions.

5. The method of claim 1, wherein determining the frequency parameter for each of the one or more extracted terms comprises:
   generating a sorted list of extracted terms arranged according to frequency parameter.

6. The method of claim 1, wherein extracting the one or more terms from the document based on the tag comprises:
   extracting one or more nouns and one or more verbs from the document;
   extracting symptoms from the document with one or more nouns and one or more verbs extracted; and
   outputting the one or more nouns, verbs, and symptoms to a weight assignment module.

7. The method of claim 1, wherein determining, based on the frequency parameter associated with each of the extracted terms whether the domain ontology comprises the one or more extracted terms comprises:
   determining whether the frequency parameter associated with each of the one or more extracted terms is above a threshold frequency parameter;
   comparing the one or more extracted terms associated with a frequency parameter above the threshold frequency parameter to existing terms in the domain ontology; and
   determining whether the one or more extracted terms match existing terms in the domain ontology.

8. The method of claim 5, wherein determining, based on the frequency parameter associated with each of the extracted terms, whether the domain ontology comprises the one or more extracted terms comprises:
   outputting the sorted list of extracted terms arranged according to frequency parameter to a user; and
   prompting the user to verify the one or more extracted terms not represented in the domain ontology.

9. A system comprising:
   a non-transitory memory; and
   a processor to:
      receive a document;
      apply one or more tags to the document, each tag applied to a term, each tag representing a part of speech;
      extract one or more terms from the document based on the tag;
      determine a frequency parameter for each of the one or more extracted terms, wherein the frequency parameter is proportional to a logarithm of a total number of documents in the domain ontology divided by a number of documents in which the term appears;
      determine, based on the frequency parameter associated with each of the extracted terms, whether a domain ontology comprises the one or more extracted terms; and
      augment, if the domain ontology does not comprise the one or more extracted terms, such that the domain ontology comprises the one or more extracted terms.

10. The system of claim 9, wherein to augment, if the domain ontology does not comprise the one or more extracted terms, such that the domain ontology comprises the one or more extracted terms the processor is to:
    render semantically the one or more extracted terms not in the domain ontology; and add the semantically rendered one or more extracted terms to the domain ontology.

11. The system of claim 9, wherein to apply the tag to the one or more words in the document based on one or more parts of speech the processor is to apply a tag to the one or more words corresponding to the part of speech of the word.

12. The system of claim 9, wherein to determine the frequency parameter for each of the one or more extracted terms the processor is to:
generate a sorted list of extracted terms arranged according to frequencies.

13. The system of claim 9, wherein to extract the one or more terms from the document based on the tag the processor is to:
extract one or more nouns and one or more verbs from the document;
extract symptoms from the document with one or more nouns and one or more verbs extracted; and
output the one or more nouns, verbs, and symptoms to a weight assignment module.

14. The system of claim 9, wherein to determine, based on the frequency parameter associated with each of the extracted terms, whether a domain ontology comprises the one or more extracted terms the processor is to:
determine whether the frequency parameter associated with each of the one or more extracted terms is above a threshold frequency parameter;
compare the one or more extracted terms associated with a frequency parameter above the threshold frequency parameter to existing terms in the domain ontology; and
determine whether the one or more extracted terms match existing terms in the domain ontology.

15. The system of claim 9, wherein to determine a frequency parameter for each of the one or more extracted terms the processor is to determine a criticality of the one or more terms.

16. A method comprising:
receiving a technician verbatim;
categorizing one or more terms in the technician verbatim based on one or more types of speech;
applying metadata to the one or more terms based on the categorization;
determining a frequency parameter for each of the one or more terms, wherein the frequency parameter is proportional to a logarithm of a total number of verbatims in the domain ontology divided by a number of verbatims in which the one or more terms appears;
extracting one or more terms from the technician verbatim based on the metadata and the frequency parameter;
determining, based on the frequency parameter, whether an ontology comprises the one or more extracted terms; and
adding, if the ontology does not comprise the one or more extracted terms, the one or more extracted terms to the ontology.

17. The method of claim 16, wherein extracting one or more terms from the technician verbatim based on the metadata comprises extracting one or more nouns corresponding to one or more parts and one or more verbs corresponding to one or more actions from the technician verbatim.

18. The method of claim 16, wherein adding, if the ontology does not comprise the one or more extracted terms, the one or more extracted terms to the ontology comprises:
applying semantics to the one or more extracted terms; and
adding the one or more terms with applied semantics to the ontology.

19. The method of claim 16, wherein determining whether the ontology comprises the one or more extracted terms comprises:
measuring similarity between the one or more extracted terms and one or more terms in the ontology; and
verifying whether the one or more terms matches the one or more terms in the ontology based on the measured similarity.

\* \* \* \* \*